(12) United States Patent
Leblans et al.

(10) Patent No.: US 7,102,143 B2
(45) Date of Patent: Sep. 5, 2006

(54) BINDERLESS STORAGE PHOSPHOR SCREEN COMPRISING A SUPPORT INCLUDING AN AMORPHOUS (A-C) CARBON LAYER

(75) Inventors: Paul Leblans, Kontich (BE); Toshio Takabayashi Toshio, Hamamatsu (JP)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 11/359,073

(22) Filed: Feb. 22, 2006

(65) Prior Publication Data
US 2006/0138346 A1 Jun. 29, 2006

(51) Int. Cl.
G03B 42/08 (2006.01)
G21K 4/00 (2006.01)

(52) U.S. Cl. .............................. 250/483.1; 250/484.4; 378/37; 378/96

(58) Field of Classification Search ............. 250/483.1, 250/484.2, 484.4, 581, 585; 378/37, 96
See application file for complete search history.

(56) References Cited

U.S. PATENT DOCUMENTS

| | | | | |
|---|---|---|---|---|
| 5,212,719 | A * | 5/1993 | Virta et al. | 378/155 |
| 5,771,271 | A * | 6/1998 | Iodice | 378/96 |
| 6,734,441 | B1 * | 5/2004 | Wendlandt | 250/485.1 |
| 7,019,300 | B1 * | 3/2006 | Watanabe | 250/370.08 |
| 2003/0010923 | A1* | 1/2003 | Zur | 250/370.09 |
| 2004/0051441 | A1* | 3/2004 | Leblans et al. | 313/486 |
| 2004/0062355 | A1* | 4/2004 | Van den Bergh et al. | 378/183 |
| 2004/0131145 | A1* | 7/2004 | Ohara | 378/37 |

* cited by examiner

Primary Examiner—Albert Gagliardi
(74) Attorney, Agent, or Firm—Joseph T. Guy; Nexsen Pruet, LLC

(57) ABSTRACT

A binderless storage phosphor screen comprises a vacuum deposited phosphor layer on a support, wherein the support includes a layer of amorphous carbon and, optionally, one or more auxilliary layers.

25 Claims, 1 Drawing Sheet

BINDERLESS STORAGE PHOSPHOR SCREEN COMPRISING A SUPPORT INCLUDING AN AMORPHOUS (A-C) CARBON LAYER

The application claims the benefit of U.S. provisional application No. 60/394,581 filed Jul. 9, 2002.

FIELD OF THE INVENTION

This invention relates to a binderless phosphor screen with a support including an amorphous carbon (a-C) layer.

BACKGROUND OF THE INVENTION

A well-known use of phosphors is in the production of X-ray images. In a conventional radiographic system an X-ray radiograph is obtained by X-rays transmitted image-wise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

According to another method of recording and reproducing an X-ray pattern disclosed e.g., in U.S. Pat. No. 3,859,527 a special type of phosphor is used, known as a photostimulable phosphor, which being incorporated in a panel or screen, is exposed to incident pattern-wise modulated X-ray beam and, as a result thereof, temporarily stores energy contained in the X-ray radiation pattern. At some interval after the exposure, a beam of visible or infra-red light scans the panel or screen to stimulate the release of stored energy as light that is detected and converted to sequential electrical signals which can be processed to produce a visible image. For this purpose, the phosphor should store as much as possible of the incident X-ray energy and emit as little as possible of the stored energy until stimulated by the scanning beam. This is called "digital radiography" or "Computed Radiography" (CR).

In both kinds of radiography the amount of exposure given for an examination is often tuned by a "phototimer". A "phototimer" comprises a radiometer for measuring the radiation dose passing through the object (patient) and the radiographic imaging system and a connection to the source of penetrating radiation for switching the penetrating radiation source off as soon as a pre-set dose is reached. In systems using such a phototimer it is important that a well measurable dose reaches the radiometer in the phototimer, since when the dose reaching the phototimer is too low, the reproducibility of the off-switching of the source of penetrating radiation is not what it should be from the point of view of image quality. Thus, the imaging system should itself only absorb penetrating radiation up to such an extent as is necessary for good speed and image quality so that— with a patient dose as low as possible and only dictated by the examination at hand—the radiometer is reached by a sufficiently high exposure dose for reproducible off-switching of the source of penetrating radiation.

In a practical setting the amount of radiation that reaches the "phototimer" is determined by the absorption of penetrating radiation by the object, the tube side of the cassette containing the storage phosphor panel or screen and the back side of the cassette. The absorption of the storage phosphor panel or screen is determined by the phosphor that is used, the amount of phosphor and the support. Higher absorption in the phosphor layer is advantageous for speed and image quality of the radiographic imaging system so there is a need to increase the thickness (the absorption) of the phosphor layer, this can only be done when the total absorption of phosphor layer and support remains almost constant. Thus increasing the thickness of the phosphor layer must be compensated by lowering the absorption of penetrating radiation in the support. Especially in radiographic techniques where penetrating radiation of low energy is used (e.g. mammography, certain non-destructive testing applications, etc.) the contribution of the support to the absorption of the phosphor screen or panel or screen can not be neglected.

The lowering of the absorption of penetrating radiation by the support can be done by lowering the thickness of the support, by using a support with low absorption, etc. On the other hand the support of the storage phosphor panel or screen should have high mechanical strength, low brittleness and, in case of vacuum deposition of the phosphor on it, be able to withstand the temperatures encountered during vapor deposition. Thus the need for a support giving a good compromise between often contradictory properties, as those cited above, remains present.

OBJECTS AND SUMMARY OF THE INVENTION

It is an object of the invention to provide a storage phosphor panel or screen including a support with low absorption of penetrating radiation that has high mechanical strength and that can be used when applying vapor deposition of a phosphor.

It is a further object of the invention to provide a storage phosphor panel or screen including a support with low absorption of X-ray radiation with an energy lower than 70 keV that has high mechanical strength and that can be used when applying vapor deposition of a phosphor, the panel or screen being well suited for use in mammography.

The object of the invention is realized by providing a storage phosphor panel or screen as claimed in claim 1. Specific features for preferred embodiments of the invention are disclosed in the dependent claims.

Further advantages and embodiments of the present invention will become apparent from the following description.

DETAILED DESCRIPTION OF THE INVENTION

In the production of binderless phosphor screens by means of chemical vapor deposition in vacuum, the support on which the phosphor is deposited can be heated up to a temperature of about 400° C. So use of a thermostable support is necessary. Therefore, though being a support containing only elements with low atomic number, a polymeric support is not the most suitable. It was now found that including an amorphous carbon film in the support did open perspectives in order to produce a binderless storage phosphor screen on a support with low X-ray absorption, even if the storage phosphor layer is applied by vacuum deposition at fairly high temperatures. Amorphous carbon films suitable for use in this invention are commercially available through, e.g., Tokay Carbon Co, LTD of Tokyo, Japan or Nisshinbo Industries, Inc of Tokyo, Japan, where they are termed "Glass-Like Carbon Film", or "Glassy Carbon".

In a binderless phosphor panel or screen according to the present invention, the thickness of the amorphous carbon layer can range from 100 µm up to 3000 µm, a thickness between 500 µm and 2000 µm being preferred as compromise between flexibility, strength and X-ray absorption.

A First Embodiment of the Invention

Figure 1:
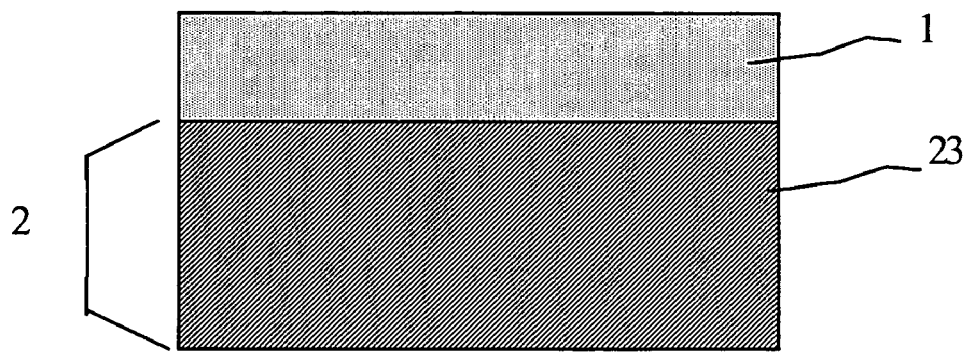
FIG. 1 shows schematically an embodiment of a storage phosphor panel or screen of this invention.

In a binderless storage phosphor screen of the present invention the storage phosphor layer can be directly positioned adjacent to the amorphous carbon layer, e.g., by vacuum depositing the storage phosphor on the amorphous carbon film, and the screen can be used without adding further layers to the screen, this is a very simple embodiment of a storage phosphor screen of the present invention. This embodiment is shown in FIG. 1 wherein a storage phosphor layer (1) on a support (2) is adjacent to an amorphous carbon layer (23).

A Second Embodiment of the Invention

Figure 2:
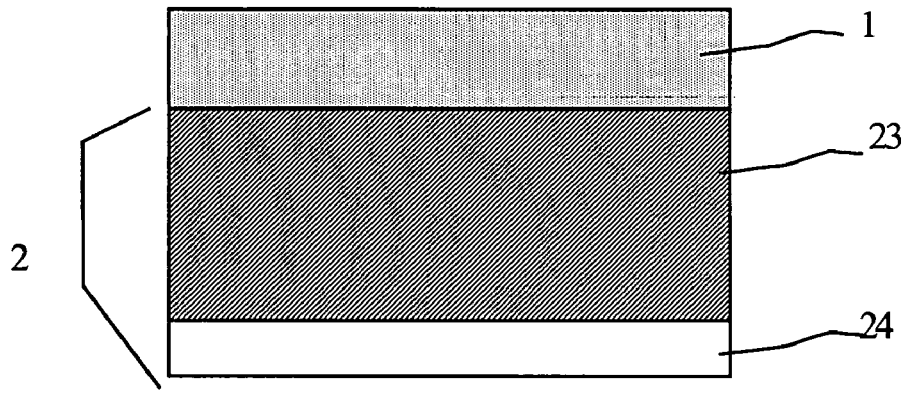
FIG. 2 shows schematically a further embodiment of a storage phosphor panel or screen of this invention.

In a further embodiment of the storage phosphor screen or panel according to the present invention an auxiliary layer can be added to the screen at the side of the amorphous carbon layer facing away from the phosphor layer. Such a screen is shown in FIG. 2, wherein a phosphor layer (1) on a support (2) is schematically shown wherein the support includes an amorphous carbon layer (23) and an auxiliary layer (24). This auxiliary layer is preferably a polymeric layer that is laminated to the amorphous carbon layer. By doing so the mechanical strength, especially with respect to brittleness and flexibility, of the panel or screen of the present invention is enhanced. The need for very high mechanical strength is especially present in the radiographic systems making use of a storage phosphor panel wherein during reading of the energy stored in the panel, the panel is automatically removed from the cassette, moved through a reader, often via a sinuous path, and then put back in the cassette. In such a reader it is quite advantageous to make use of a screen or panel of the present invention with an auxiliary layer laminated on the amorphous carbon layer. This auxiliary layer can be any polymeric film known in the art, e.g. polyester film, polyvinylchloride, polycarbonate, syntactic polystyrene, etc. Preferred polymeric films are polyester ester films, as e.g., polyethylene terephthalate films, polyethylene naphthalate films, etc. The thickness of the auxiliary layer (24) can range from 1 µm to 500 µm. It is possible to use a fairly thin amorphous carbon film, e.g., 400 µm and laminate a 500 µm thick auxiliary film to it as well as to use a thick amorphous carbon film, e.g., 2000 µm thick with a thin, e.g., 6 µm thick, polymeric film laminated onto it. The relative thickness of the amorphous carbon and polymeric film can be varied widely and is only directed by the required physical strength of the amorphous carbon during deposition of the phosphor layer and the required flexibility during use of the panel.

A Third Embodiment of the Invention

It has been shown, e.g. in the European Patent Application No. 02100763.8 concurrently filed herewith, Jun. 28, 2002, that adding a specularly reflecting layer between the phosphor layer and the amorphous carbon layer can enhance both image quality and speed of the screen or panel. Also in a panel according to the present invention, the addition of such a specularly reflecting auxiliary layer may be beneficial. When such a layer is added, it preferably reflects at least 80% of the light impinging on it in a specular way. More preferably said layer reflects 90% of the impinging light specularly. Such layers are preferably very thin (thickness under 20 µm, preferably under 10 µm) metal layers. When in a screen or panel according to the present invention, a specularly reflecting layer is present, it is preferred that the layer is a thin aluminum layer (thickness preferably lower than or equal to 10 µm, more preferably lower than or equal to 5 µm). Since such a thin metal layer can be quite corrosion sensitive it is preferred that, when a specularly reflecting metal layer is present in a panel or screen of the present invention, that this layer is covered with a barrier layer (a further auxiliary layer) that impedes water and/or moisture of reaching the relecting auxiliary layer. Such a barrier layer can be any moisture barrier layer known in the art, but is preferably a layer of parylene. Most preferred polymers for use in the barrier layer of the present invention are vacuum deposited, preferably chemical vacuum deposited poly-p-xylylene film. A poly-p-xylylene has repeating units in the range from 10 to 10000, wherein each repeating unit has an aromatic nuclear group, whether or not substituted. As a basic agent the commercially available di-p-xylylene composition sold by the Union Carbide Co. under the trademark "PARYLENE" is thus preferred. The preferred compositions for the barrier layer are the unsubstituted "PARYLENE N", the monochlorine substituted "PARYLENE C", the dichlorine substituted "PARYLENE D" and the "PARYLENE HT" (a completely fluorine substituted version of PARYLENE N, opposite to the other "parylenes" resistant to heat up to a temperature of 400° C. and also resistant to ultra-violet radiation, moisture resistance being about the same as the moisture resistance of "PARYLENE C"). Most preferred polymers for use in the preparation of the barrier layer in a panel of this invention are poly(p-2-chloroxylylene), i.e. PARYLENE C film, poly(p-2,6-dichloroxylylene), i.e. PARYLENE D film and "PARYLENE HT" (a completely fluorine substituted version of PARYLENE N. The advantage of parylene layers as moisture barrier layers in a panel or screen of the present invention layer is the temperature resistance of the layers, the temperature resistance of the parylene layers is such that they can withstand the temperature need for vacuum depositing the storage phosphor. The use of parylene layers in storage phosphor screens has been disclosed in, e.g., EP-A's 1 286 362, 1 286 363, 1 286 364 and 1 286 365.

Figure 3:
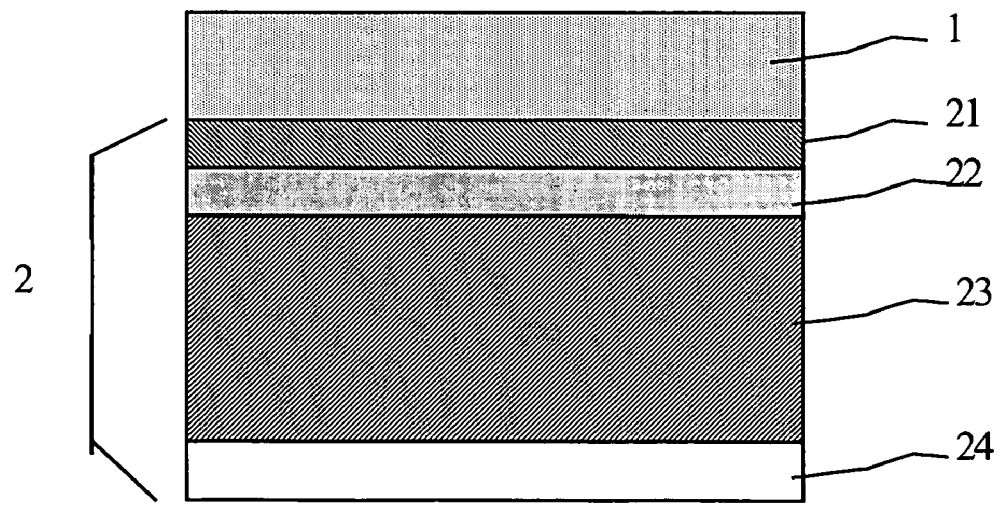
FIG. 3 shows schematically an other embodiment of a storage phosphor panel or screen of this invention.

Thus a screen or a panel according to this third embodiment of the invention as set forth hereinbefore has (FIG. 3) a phosphor layer (1) and a support (2) wherein the support includes an amorphous carbon layer (23) and between the phosphor and the amorphous carbon layer a specularly reflecting layer (22) adjacent to the amorphous carbon layer and a parylene layer (21) on top of the reflecting layer. A polymeric layer (24) is laminated to the amorphous carbon layer. In a preferred embodiment according to the present invention said reflective auxiliary layer (22) is an aluminum layer with a thickness between 0.2 µm and 200 µm.

The invention moreover includes a method for producing a storage phosphor panel comprising the steps of:
providing an amorphous carbon film,
vacuum depositing a storage phosphor layer on said amorphous carbon film and optionally laminating a polymeric film on the side of the amorphous carbon film not covered by said phosphor.

The invention further includes a method for producing a storage phosphor panel comprising the steps of:
providing an amorphous carbon film
applying a specularly reflecting layer on said amorphous carbon film,
vacuum depositing a storage phosphor layer on said amorphous carbon film and
optionally laminating a polymeric film on the side of the amorphous carbon film not covered by said phosphor.

The invention further includes a method for producing a storage phosphor panel comprising the steps of:
providing an amorphous carbon film
applying a specularly reflecting layer on said amorphous carbon film
chemical vacuum depositing a parylene layer on top of said specularly reflecting layer,
vacuum depositing a storage phosphor layer on said amorphous carbon film and, optionally,
laminating a polymeric film on the side of the amorphous carbon film not covered by said phosphor.

The screen or panel of this invention can include on top of the phosphor layer any protective layer known in the art. Especially suitable for use are those protective layers disclosed in EP-A's 1 286 363, 1 316 969 and 1 316 970. Screens or panels according to the present invention, wherein a moisture-repellent layer is present inbetween said substrate and said phosphor layer are advantageously used, and, furtheron a screen or panel according to the present invention, wherein, adjacent to the said phosphor layer, a moisture-repellent layer is coated as an outermost layer is even more preferred. Especially said screens or panels having moisture-repellent parylene layers are recommended. Screens or panels, wherein said phosphor layer is sandwiched between two moisture-repellent parylene layers provides an excellent protection.

The screen or the panel of the present invention may also have reinforced edges as described in, e.g., U.S. Pat. No. 5,334,842 and U.S. Pat. No. 5,340,661.

The surface of the phosphor layer (1) in a panel or screen of the present invention can be made smaller than the surface of the support (2) so that the phosphor layer does not reach the edges of the support. Such a screen has been disclosed in, e.g., EP-A 1 286 363.

The storage phosphor used in a panel or screen of the present invention is preferably an alkali metal storage phosphor. Such a phosphor is disclosed in U.S. Pat. No. 5,736,069 and corresponds to the formula: $M^{1+}X \cdot aM^{2+}X'_2 bM^{3+}X''_3 : cZ$ wherein: $M^{1+}$ is at least one member selected from the group consisting of Li, Na, K, Cs and Rb,
$M^{2+}$ is at least one member selected from the group consisting of Be, Mg, Ca, Sr, Ba, Zn, Cd, Cu, Pb and Ni,
$M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga,
Z is at least one member selected from the group $Ga^{1+}$, $Ge^{2+}$, $Sn^{2+}$, $Sb^{3+}$ and $As^{3+}$,
X, X' and X'' can be the same or different and each represents a halogen atom selected from the group consisting of F, Br, Cl, I and $0 \leq a \leq 1$, $0 \leq b \leq 1$ and $0 < c \leq 0.2$.

An especially preferred phosphor for use in a panel or screen of the present invention is a CsX:Eu stimulable phosphor, wherein X represents a halide selected from the group consisting of Br and Cl, produced by a method comprising the steps of:

mixing said CsX with between $10^{-3}$ and 5 mol % of a Europium compound selected from the group consisting of EuOX', EuX'$_2$ and EuX'$_3$, X' being a member selected from the group consisting of F, Cl, Br and I;
firing said mixture at a temperature above 450° C.;
cooling said mixture and
recovering the CsX:Eu phosphor.

Such a phosphor has been disclosed in EP-A-1 203 394.

The phosphor is preferably vacuum deposited on the support under conditions disclosed in EP-A-1 113 458 and EP-A-1 118 540.

In a preferred embodiment the panel or screen according to the present invention is a binderless phosphor panel or screen, wherein said phosphor layer comprises a needle-shaped CsX:Eu phosphor, wherein X represents a halide selected from the group consisting of Br and Cl.

The present invention moreover includes a method for exposing an object to X-rays comprising the steps of:
providing an X-ray machine including an X-ray tube equipped for emitting X-rays with an energy lower than or equal to 70 keV and a phototimer coupled to said X-ray tube for switching said tube on and off in accordance with an X-ray dose reaching said phototimer,
placing an object between said X-ray tube and said phototimer
placing a binderless storage phosphor panel or screen according to this invention between said object and said phototimer and
activating said X-ray tube for exposing said object, said cassette and said phototimer until said phototimer switches said X-ray tube off.

The present invention further includes a method according as described just hereinbefore, wherein said X-ray tube is equipped for emitting X-rays with an energy lower than or equal to 40 keV.

A screen or panel of this invention is thus very well suited for use in mammography where X-ray machines with low keV are used, and in certain non-destructive testing applications.

PARTS LIST 1. phosphor layer
2. support
21 auxiliary layer, moisture barrier layer
22 auxiliary layer, specularly reflecting layer
23 amorphous carbon layer
24 auxiliary layer, polymeric layer

EXAMPLES

While the present invention will hereinafter be described in connection with preferred embodiments thereof, it will be understood that it is not intended to limit the invention to those embodiments.

An X-ray cassette with a phosphor screen or panel was exposed with X-rays having an energy of 28 keV from a Mo-anode (30 μm Mo, intern filtering and without filtering, respectively).

A Mammory Detail R® screen, trade marketed product from Agfa-Gevaert, Morstel, Belgium, was taken as a comparative screen: as that system just admits use of a "phototimer" (with respect to absorption of X-ray exposure energy as explained in the detailed description hereinbefore). Absorption for all examined cassettes with screens or panels should thus not exceed the absorption, measured for the comparative screen, set forth hereinbefore.

Starting from a 10 mR X-ray dose reaching the cassette, X-rays passing through 4 cm of a polymethyl methacrylate polymeric layer, further consecutively passing the cassette bottom (3 mm of polyethylene), the panel or screen (varying composition in the experiments as will be explained hereinafter) and the cassette cover (4.1 mm of polyethylene), it has been measured that a dose in the range from 0.75 up to 0.85 mR is required in order to get an acceptable and precise working of the "phototimer", in order to avoid too much exposure to X-rays for the patient.

In the panels or screens, CsBr:Eu phosphor layers (of varying thicknesses, expressed in μm and indicated in the Table 1) were coated on varying supports (aluminum, a-C "amorphous carbon", glass and iron), having varying thicknesses (expressed in μm in the Table 1) and X-ray energies (doses in mR) reaching the "phototimer" have been summarized in the Table 1 for each examined panel or screen. As a thickness of the support layer, the thickness still offering enough dose at the position of the phototimer after the X-rays have passed the cassette, for differing thicknesses of the CsBr:Eu phosphor layer, have been given in the Table 1 hereinafter.

TABLE 1

| Support material and its thickness (μm) | CsBr:Eu phosphor layer thickness (μm) | Dose detected at the phototimer (mR) |
|---|---|---|
| Al 100 μm | 150 μm | 0.75 |
| Al 400 μm | 125 μm | 0.78 |
| Al 800 μm | 100 μm | 0.76 |
| a-C 2000 μm | 150 μm | 0.73 |
| a-C 2000 μm | 125 μm | 0.81 |
| a-C 2000 μm | 100 μm | 0.91 |
| Glass 2000 μm | 140 μm | 0.95 |
| Glass 2000 μm | 150 μm | 0.85 |
| Glass 2000 μm | 160 μm | 0.76 |
| Fe 100 μm | 60 μm | 0.55 |
| Fe 100 μm | 80 μm | 0.44 |
| Fe 100 μm | 100 μm | 0.36 |

From the results obtained in the Table 1, it is clear that the amorphous carbon (a-C) support is superior as little absorption occurs, if compared e.g. with Fe (not suitable for use, even not for a layer thickness of only 100 μm) and with aluminum (suitable for use up to 800 μm for a thinner phosphor layer of 100 μm): amorphous carbon provides enough dose at the position of the phototimer, even for the thickest phosphor layer (150 μm) and a thickness of 2000 μm is perfectly suitable for use! Amorphous carbon is comparable with glass as illustrated in Table 1, but it is superior with respect to glass as it is much more suitable to be applied in the manufacturing of phosphor panels or screens of the present invention.

Having described in detail preferred embodiments of the current invention, it will now be apparent to those skilled in the art that numerous modifications can be made therein without departing from the scope of the invention as defined in the appending claims.

What is claimed is:

1. A method for exposing an object to X-rays comprising the steps of:
providing an X-ray machine including an X-ray tube equipped for emitting X-rays with an energy lower than or equal to 70 keV and a phototimer coupled to said X-ray tube for switching said tube on and off in accordance with an X-ray dose in the range from 0.75 up to 0.85 mR reaching said phototimer,
placing an object between said X-ray tube and said phototimer,
placing a cassette with a binderless storage phosphor panel or screen between said object and said phototimer and
activating said X-ray tube for exposing said object, said cassette and said phototimer until said phototimer switches said X-ray tube off, wherein said binderless storage phosphor panel comprises a vacuum deposited phosphor layer (1) on a support (2), and wherein said support includes a layer of amorphous carbon (23) having a thickness between 500 μm and 2000 μm.

2. Method according to claim 1, wherein said support further includes a reflective auxiliary aluminum layer (22) with a thickness between 0.2 μm and 200 μm.

3. Method according to claim 2, wherein said support further includes a protective auxiliary layer (21) between said reflective auxiliary layer and said phosphor layer.

4. Method according to claim 3, wherein said protective auxiliary layer (21) is a layer of parylene wherein said parylene is selected from the group consisting of parylene C, parylene D and parylene HT.

5. Method according to claim 4, wherein said phosphor layer comprises a needle shaped CsX:Eu phosphor, wherein X represents a halide selected from the group consisting of Br and Cl.

6. Method according to claim 5, wherein said support further includes a polymeric auxiliary layer (24) farther away from said phosphor layer than said layer of amorphous carbon.

7. Method according to claim 4, wherein said support further includes a polymeric auxiliary layer (24) farther away from said phosphor layer than said layer of amorphous carbon.

8. Method according to claim 3, wherein said phosphor layer comprises a needle shaped CsX:Eu phosphor, wherein X represents a halide selected from the group consisting of Br and Cl.

9. Method according to claim 8, wherein said support further includes a polymeric auxiliary layer (24) farther away from said phosphor layer than said layer of amorphous carbon.

10. Method according to claim 3, wherein said support further includes a polymeric auxiliary layer (24) farther away from said phosphor layer than said layer of amorphous carbon.

11. Method according to claim 2, wherein said phosphor layer comprises a needle shaped CsX:Eu phosphor, wherein X represents a halide selected from the group consisting of Br and Cl.

12. Method according to claim 11, wherein said support further includes a polymeric auxiliary layer (24) farther away from said phosphor layer than said layer of amorphous carbon.

13. Method according to claim 2, wherein said support further includes a polymeric auxiliary layer (24) farther away from said phosphor layer than said layer of amorphous carbon.

14. Method according to claim 1, wherein said support further includes a protective auxiliary layer (21) between said reflective auxiliary layer and said phosphor layer.

15. Method according to claim 14, wherein said protective auxiliary layer (21) is a layer of parylene wherein said parylene is selected from the group consisting of parylene C, parylene D and parylene HT.

16. Method according to claim 15, wherein said phosphor layer comprises a needle shaped CsX:Eu phosphor, wherein X represents a halide selected from the group consisting of Br and Cl.

17. Method according to claim 16, wherein said support further includes a polymeric auxiliary layer (24) farther away from said phosphor layer than said layer of amorphous carbon.

18. Method according to claim 15, wherein said support further includes a polymeric auxiliary layer (24) farther away from said phosphor layer than said layer of amorphous carbon.

19. Method according to claim 14, wherein said phosphor layer comprises a needle shaped CsX:Eu phosphor, wherein X represents a halide selected from the group consisting of Br and Cl.

20. Method according to claim 19, wherein said support further includes a polymeric auxiliary layer (24) farther away from said phosphor layer than said layer of amorphous carbon.

21. Method according to claim 14, wherein said support further includes a polymeric auxiliary layer (24) farther away from said phosphor layer than said layer of amorphous carbon.

22. Method according to claim 1, wherein said phosphor layer comprises a needle shaped CsX:Eu phosphor, wherein X represents a halide selected from the group consisting of Br and Cl.

23. Method according to claim 22, wherein said support further includes a polymeric auxiliary layer (24) farther away from said phosphor layer than said layer of amorphous carbon.

24. Method according to claim 1, wherein said support further includes a polymeric auxiliary layer (24) farther away from said phosphor layer than said layer of amorphous carbon.

25. Method according to claim 1, wherein said method is a mammographic application method.

* * * * *

UNITED STATES PATENT AND TRADEMARK OFFICE
CERTIFICATE OF CORRECTION

| | | |
|---|---|---|
| PATENT NO. | : 7,102,143 B2 | Page 1 of 1 |
| APPLICATION NO. | : 11/359073 | |
| DATED | : September 5, 2006 | |
| INVENTOR(S) | : Leblans et al. | |

It is certified that error appears in the above-identified patent and that said Letters Patent is hereby corrected as shown below:

On The Title Page: Items

Between (65) Prior Publication Date and (51) Int. Cl. insert:

RELATED U.S. APPLICAITON DATA

(62) Divisional of application No. 10/607,822 filed 6/27/2003 now abandonded.

(60) Provisional application No. 60,394,581 filed 7/9/2002.

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,102,143 B2 | Page 1 of 1 |
| APPLICATION NO. | : 11/359073 | |
| DATED | : September 5, 2006 | |
| INVENTOR(S) | : Leblans et al. | |

It is certified that error appears in the above-identified patent and that said Letters Patent is hereby corrected as shown below:

It is certified that error appears in the above-identified patent and that said Letters Patent is hereby corrected as shown below:

On the Title Page, Item:
Between (60) Provisional Application and (51) Int. Cl. insert:

(30) Foreign Application Priority Data

June 28, 2002    EP..............................02100764.6

Signed and Sealed this

Eighteenth Day of September, 2007

JON W. DUDAS
*Director of the United States Patent and Trademark Office*